(12) United States Patent
Du et al.

(10) Patent No.: US 11,902,517 B2
(45) Date of Patent: Feb. 13, 2024

(54) METHOD AND SYSTEM FOR ADAPTIVE CROSS-COMPONENT FILTERING

(71) Applicant: Tencent America LLC, Palo Alto, CA (US)

(72) Inventors: Yixin Du, Los Altos, CA (US); Xin Zhao, San Diego, CA (US); Liang Zhao, Sunnyvale, CA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 46 days.

(21) Appl. No.: 17/684,384

(22) Filed: Mar. 1, 2022

(65) Prior Publication Data

US 2022/0191485 A1 Jun. 16, 2022

Related U.S. Application Data

(63) Continuation of application No. 17/092,157, filed on Nov. 6, 2020, now Pat. No. 11,297,316.

(60) Provisional application No. 62/953,458, filed on Dec. 24, 2019.

(51) Int. Cl.
| | |
|---|---|
| *H04N 19/117* | (2014.01) |
| *H04N 19/82* | (2014.01) |
| *H04N 19/186* | (2014.01) |
| *H04N 19/176* | (2014.01) |
| *H04N 19/159* | (2014.01) |
| *H04N 19/46* | (2014.01) |

(52) U.S. Cl.
CPC ......... *H04N 19/117* (2014.11); *H04N 19/159* (2014.11); *H04N 19/176* (2014.11); *H04N 19/186* (2014.11); *H04N 19/46* (2014.11); *H04N 19/82* (2014.11)

(58) Field of Classification Search
CPC .................................................. H04N 19/117
USPC ......................................................... 375/240
See application file for complete search history.

(56) References Cited

U.S. PATENT DOCUMENTS

| | | | |
|---|---|---|---|
| 2012/0082224 A1 | 4/2012 | Van et al. | |
| 2015/0382016 A1* | 12/2015 | Cohen ................... | H04N 19/70 375/240.12 |
| 2017/0372467 A1 | 12/2017 | Carmel et al. | |
| 2018/0324420 A1* | 11/2018 | Wang .................. | H04N 19/103 |
| 2019/0045186 A1 | 2/2019 | Zhang et al. | |

OTHER PUBLICATIONS

Cohen (Merl) R et al: "CE9: Summary report for Core Experiment 9 on IBF/CCP interdependency", 19. JCT-VC Meeting; Strasbourg, No. JCTVC-S0029, Oct. 17, 2014.
European Patent Office European Search Report for Application No. 20905001.2 dated Jan. 30, 2023 11 pages.

(Continued)

*Primary Examiner* — Amir Shahnami
(74) *Attorney, Agent, or Firm* — ANOVA LAW GROUP, PLLC

(57) ABSTRACT

An image processing method includes obtaining statistics information of a block of an image frame, determining whether the statistics information satisfies a condition, and disabling cross-component filtering (CCF) for the block in response to the statistics information satisfying the condition.

17 Claims, 10 Drawing Sheets

(56) References Cited

OTHER PUBLICATIONS

Jianle Chen et al., "Algorithm description for Versatile Video Coding and Test Model 7 (VTM 7)", Joint Video Experls Team (JVET) of ITU-T SG 16 WP 3 and ISO/IEC JTC 1/SC 29/WG 11, Oct. 2019, JVET-P2002-v1 89 pages.

Benjamin Bross et al., "Versatile Video Coding (Draft 7)," Joint Video Experls Team (JVET) of ITU-T SG 16 WP 3 and ISO/IEC JTC I/SC 29/WG 11. Oct. 2019. JVET-P2001-vE 488 Pages.

Jonathan Taquet et al., "CE5: Results oftests CE5-3.1 to CE5-3.4 on Non-Linear Adaptive Loop Filter," Joint video Experls Team (JVET) of ITU-T SG 16 WP 3 and ISO/IEC JTC I/SC 29/WG 11, Mar. 2019, JVET-N0242 10 Pages.

Chia-Yang Tsai et al., TE10 Subtest2: Coding Unit Synchronous Picture Quadtree-based Adaptive Loop Filter, Joint Collaborative Team on Video Coding (JCT-VC) of ITU-T SG 16 WP 3 and ISO/IEC JTC1/SC 29/WG11 , Oct. 2019. JCTVC-C143 12 Pages.

Kiran Misra et al., "Cross-Component Adaptive Loop Filter for chroma," Joint Video Experts Team (JVET) of ITU-T SG 16 WP 3 and ISO/IEC JTC I/SC 29/WG 11 , Jul. 2019, JVET-O0636_r1. 9 Pages.

Kiran Misra et al., "CE5-related: On the design of CC-ALF," Joint Video Experls Team (JVET) of ITU-T SG 16 WF 3 and ISO/IEC JTC 1/SC 29/WG 11. Oct. 2019. JVET-P1008-v2 6 Pages.

S.Midtskogen et al., "The AV1 constrained directional enhancement filter (CDEF)," In 2018 IEEE Intemational Conference on Acoustics, Speech and Signal Processing (ICASSP), pp. 1193-1197.IEEE, 2018 5 Pages.

Thomas J. Daede et al., "Daala: A perceptually-driven next generation video codec," arXiv preprint arXiv:1603.03129 (2016) 10 Pages.

S.Midtskogen EN et al., "Integrating Thor tools into the emerging AV1 codec," In 2017 IEEE Intemational Conference on Image Processing (ICIP), pp. 930-933. IEEE, 2017 4 Pages.

D.Mukherjeei et al. A Switchable loop-restoration With side-information framework for the emerging AV1 Video codec In 2017 IEEE International Conference on Image Processing (ICIP), pp. 265-269. IEEE, 2017 6 Pages.

Benjamin Bross et al., "Versatile Video Coding (Draft 6)," Joint Video Experts Team (JVET) of ITU-T SG 16 WP 3 and ISO/IEC JTC 1/SC 29/WG 11 , Jul. 2019, JVET-O2001-vE 460 Pages.

* cited by examiner

METHOD AND SYSTEM FOR ADAPTIVE CROSS-COMPONENT FILTERING

CROSS-REFERENCE TO RELATED APPLICATION

This application is a continuation application of U.S. patent application Ser. No. 17/092,157, filed on Nov. 6, 2020, which in turn claims priority to U.S. provisional patent application No. 62/953,458, filed Dec. 24, 2019, the entire content of all of which are incorporated herein by reference.

TECHNICAL FIELD

This application relates to the field of video coding technologies and, in particular, to a system and method for video coding with adaptive cross-component filter.

BACKGROUND

AOMedia Video 1 (AV1) is an open video coding format designed for video transmissions over the Internet. AV1 was developed as a successor to VP9 by the Alliance for Open Media (AOMedia), a consortium that includes semiconductor firms, video on demand providers, video content producers, software development companies, and web browser vendors. Many of the components of the AV1 project were sourced from previous research efforts by Alliance members. Experimental technology platforms include Daala by Xiph/Mozilla, the experimental VP9 evolution project VP10 by Google, and Thor by Cisco. Building on the codebase of VP9, AV1 incorporates additional techniques, several of which were developed in these experimental formats. Various versions of the AV1 reference codec and bitstream specification were released. The AV1 bitstream specification includes a reference video codec.

ITU-T VCEG (Q6/16) and ISO/IEC MPEG (JTC 1/SC 29/WG 11) published various versions of the H.265/HEVC (High Efficiency Video Coding) standard. These two standard organizations also jointly formed the JVET (Joint Video Exploration Team) to explore the potential of developing the next video coding standard beyond HEVC. In response to a Joint Call for Proposals (CfP) on Video Compression with Capability beyond HEVC issued by these two organizations, more than 40 responses on standard dynamic range (SDR), high dynamic range (HDR), and 360 video categories were submitted. All received CfP responses were evaluated in the 122 MPEG/10th JVET meeting. As a result of this meeting, JVET formally launched the standardization process of next-generation video coding beyond HEVC. The new standard was named Versatile Video Coding (VVC), and JVET was renamed as Joint Video Expert Team. A recent version of VTM (VVC Test Model) is VTM 7.

Cross-component filtering (CCF) is a filtering process that uses sample values of one component to refine another component. An example of CCF is cross-component adaptive loop filter (CC-ALF) proposed in JVET-O0636. Flags are used to signal, e.g., on/off of CCF for blocks in a frame being processed. For example, blocks in a smooth area are signaled to have CCF turned off. However, as CCF is not performed in a smooth area, signaling of CCF in a smooth area increases the bits overhead and the needed storage space and/or transmission bandwidth, which is especially true for an image frame having large smooth area(s).

The disclosed methods and systems are directed to solve one or more problems set forth above and other problems.

SUMMARY

In accordance with the disclosure, there is provided an image processing method including obtaining statistics information of a block of an image frame, determining whether the statistics information satisfies a condition, and disabling cross-component filtering (CCF) for the block in response to the statistics information satisfying the condition.

Also in accordance with the disclosure, there is provided an electronic device including a processor and a non-transitory computer-readable storage medium storing instructions that, when executed by the processor, cause the processor to obtain statistics information of a block of an image frame, determine whether the statistics information satisfies a condition, and disable cross-component filtering (CCF) for the block in response to the statistics information satisfying the condition.

DETAILED DESCRIPTION

The following describes the technical solutions in the embodiments of the present disclosure with reference to the accompanying drawings. Wherever possible, the same reference numbers will be used throughout the drawings to refer to the same or like parts. Apparently, the described embodiments are merely some but not all the embodiments of the present invention. Other embodiments obtained by a person skilled in the art based on the embodiments of the present invention without creative efforts shall fall within the scope of the present disclosure.

Certain acronyms and terms used in this disclosure are listed as follows.

ALF: Adaptive Loop Filter
APS: Adaptation Parameter Set
CBF: Coded Block Flag
CC-ALF: Cross-Component Adaptive Loop Filter/Filtering
CCF: Cross-Component Filter/Filtering
CDEF: Constrained Directional Enhancement Filter/Filtering
DC: Direct Current
HEVC: High Efficiency Video Coding
JVET: Joint Video Exploration Team
QP: Quantization Parameter
SAO: Sample Adaptive Offset
VVC: Versatile Video Coding
Bitstream: A sequence of bits that forms the representation of coded image frames and associated data.
Flag: A variable or single-bit syntax element that can take one of several possible values, such as one of two possible values: 0 and 1.
Syntax element: An element of data represented in the bitstream.
Syntax structure: Zero or more syntax elements present together in the bitstream in a specified order.

Figure 1:
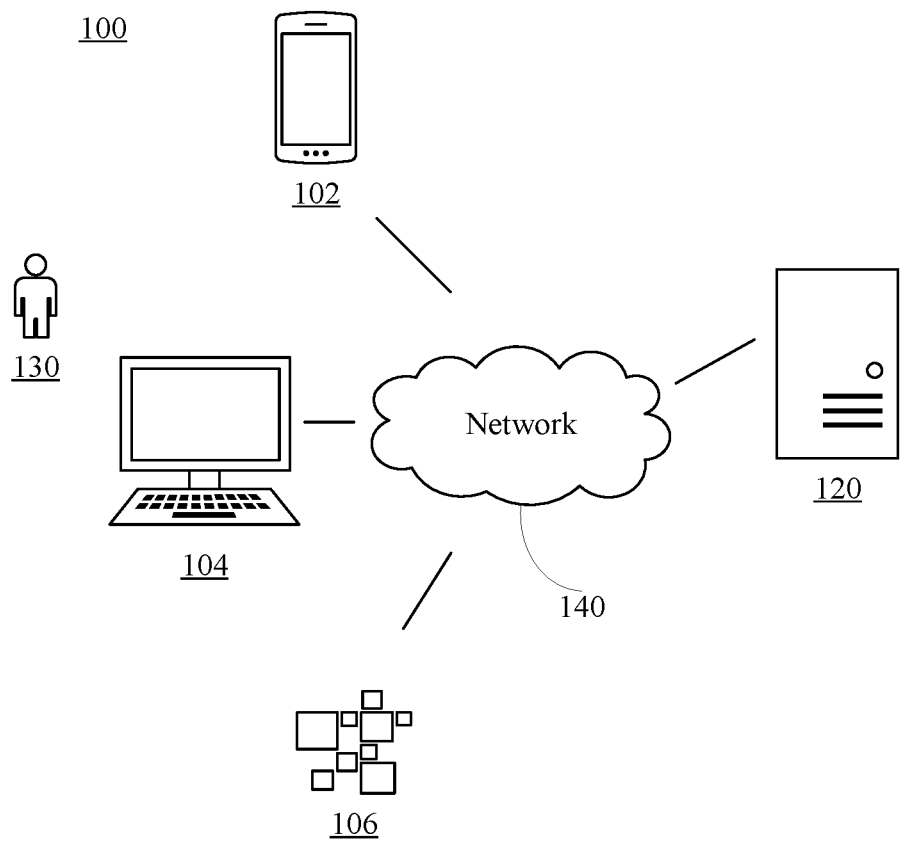
FIG. 1 shows an example operating environment consistent with the present disclosure.

FIG. 1 shows an example operating environment 100 consistent with the disclosure. The operating environment 100 may include a variety of devices with video functionalities. For example, as shown in FIG. 1, the operating environment 100 includes a mobile device 102, a terminal device 104, and an electronic device 106. Other types of devices may also be included.

In some embodiments, as shown in FIG. 1, the operating environment 100 also includes a server 120, one or more users 130, and a communication network 140 connecting the variety of devices and the server 120. The user(s) 130 may use, access, or control one or more of the variety of devices.

The mobile device 102, the terminal device 104, and the electronic device 106 may be generally referred to as terminal devices, which may include any user terminal, such as a personal digital assistant (PDA), a mobile phone, a smart phone, an integrated messaging device (IMD), a tablet computer, a notebook computer, a desktop computer, or another computing device. A terminal device may also include any image or video capturing device, such as a digital camera, a video camera, a security camera, a vehicle on-board camera, or a stereo camera, etc., or any electronic device with a video function, such as a digital doorbell, an autonomous driving sensor, a digital voice assistant, a smart speaker, a smart appliance, or any industrial or commercial IoT system with video processing capability. Any of the mobile device 102, terminal device 104, and electronic device 106 may be stationary or mobile when carried by an individual who is moving, and may also be located as a part or in a mode of transport including a car, a truck, a taxi, a bus, a train, a boat, an airplane, a bicycle, a motorcycle, or any similar suitable mode of transport.

The network 140 may include any appropriate type of communication network and may include any combination of wired or wireless networks including, but not limited to, a wireless cellular telephone network, a wireless local area network (WLAN), a Bluetooth personal area network, an Ethernet local area network, a token ring local area network, a wide area network, and the Internet. The network 140 may also include private or public cloud computing platform for voice/data communication. When the Internet or other type of network is included, connectivity to the Internet may include long range wireless connections, short range wireless connections, and/or various wired connections including telephone lines, cable lines, power lines, and/or similar communication pathways.

The server 120 may include any type of server computer system or multiple computer systems configured in a server cluster or distributed in different locations. The server 120 may also include a cloud server on a cloud computing platform. The server 120 may also be referred to as a server entity, which may be integrated with any appropriate device (including the electronic device) for performing the server-side functionalities of video decoding and application processing.

Figure 2:
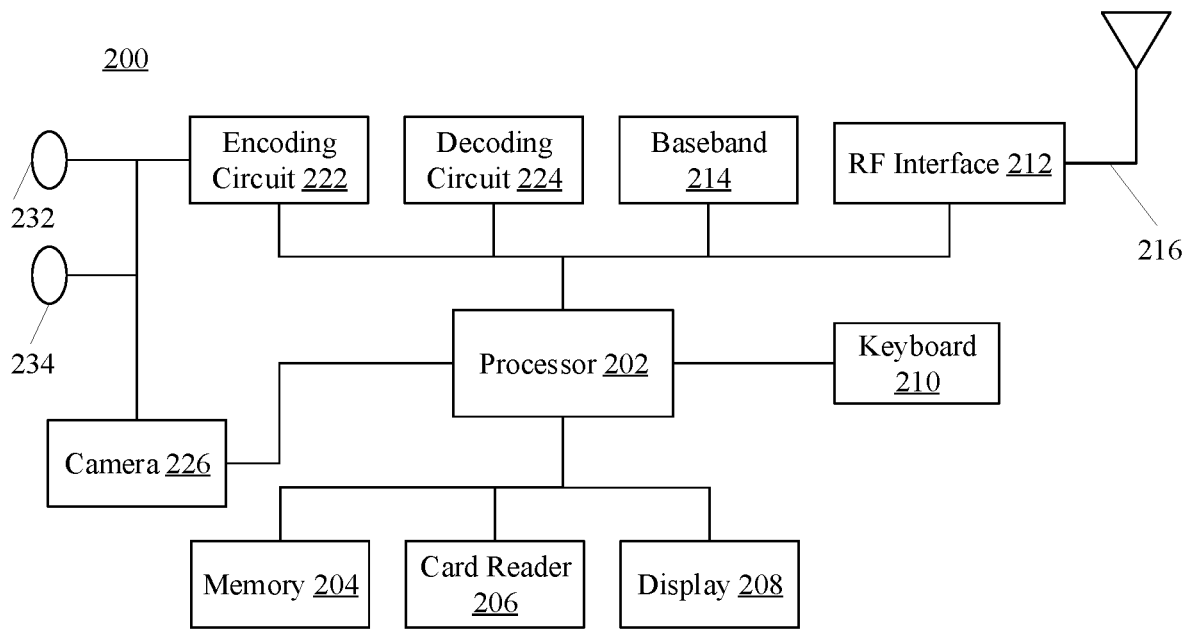
FIG. 2 shows an example computer system consistent with the disclosure.

FIG. 2 illustrates an exemplary computer system implementing certain aspects of the variety of terminal devices 102, 104, and/or 106, and/or the server 120. As shown in FIG. 2, the computer system 200 includes a hardware processor 202, a memory 204, a card reader 206, a display 208, a keyboard 210, a radio-frequency (RF) interface 212, a baseband 214, an antenna 216, an encoding circuit 222, a decoding circuit 224, a camera 226, a speaker 232, and a microphone 234. The components shown in FIG. 2 are illustrative, certain components may be omitted, and other components may be added.

The processor 202 may be provided for controlling the computer system 200. The processor 202 may be connected to other components through one or more buses or other electrical connections to send data to and receive data from the other components. The processor 202 may include one or more processing cores, for example, the processor 202 may be a 4-core processor or an 8-core processor. The processor 202 may be implemented by using at least one hardware form of a digital signal processing (DSP), a field-programmable gate array (FPGA), or a programmable logic array (PLA). The processor 202 may also include a main processor and a coprocessor. The main processor may be a central processing unit (CPU), and the coprocessor may be a graphics processing unit (GPU) configured to be responsible for rendering and drawing content that a display screen needs to display. In some embodiments, the processor 202 may further include an artificial intelligence (AI) processor. The AI processor is configured to process a computing operation related to machine learning.

The memory 204 may include one or more computer-readable storage media, such as a high-speed random-access memory and/or a nonvolatile memory, for example, one or more disk storage devices or flash storage devices. The memory 204 may store both data in the form of image and audio data and may also store instructions for the processor 202. The card reader 206 may include any type of portable card interface, such as a smart card interface, a communication card interface (e.g., near field communication (NFC) card), or a subscriber identifier module (SIM) card or other card interface for providing user information and being suitable for providing authentication information for authentication and authorization of the user 130.

Further, the display 208 may involve any suitable display technology suitable to display an image or video. For example, the display 208 may include a liquid crystal display (LCD) screen, an organic light-emitting diode (OLED) screen, or the like, and may be a touch screen. The keyboard 210 may include a physical or virtual keyboard to input information by the user, and may also include another type of input/output device. The speaker 232 and the microphone 234 may be used to input and output audio for the computer system 200.

The RF interface 212 (together with the antenna 216) may include RF circuitry for receiving and transmitting RF signals. The RF interface 212 may convert an electrical signal to an electromagnetic signal for transmission or convert a received electromagnetic signal into an electrical signal for receiving. The RF interface 212 may communicate with other electronic devices through at least one wireless communication protocol. The wireless communication protocol may include a metropolitan area network, mobile communications networks (2G, 3G, 4G, and 5G) of various generations, a wireless local area network (LAN), and/or a wireless fidelity (WiFi) network. In some embodiments, the RF interface 212 may also include a circuit related to near field communication (NFC). The baseband 214 may include circuitry for processing the signals to and from the RF interface 212.

Further, the camera 226 may include any type of imaging or video capturing device configured to collect an image or a video. When the computer system 200 is a portable device carried by the user, the camera 226 may include a front-facing camera and a rear-facing camera. The front-facing camera may be disposed at the front panel of the electronic device, and the rear-facing camera is disposed at a rear surface of the electronic device. In some embodiments, there are at least two rear-facing cameras, each being any one of a main camera, a depth-of-field camera, a wide-angle camera, and a telephoto camera, so as to implement a background blurring function by fusing the main camera with the depth-of-field camera, and implement panoramic shooting and virtual reality (VR) shooting functions or other fusing shooting functions by fusing the main camera with the wide-angle camera. In some embodiments, the camera 226 may further include a flash.

The encoding circuit 222 and the decoding circuit 224 may be referred to as the codec circuitry of the electronic device suitable for carrying out encoding and decoding of audio and/or video data or assisting in encoding and decoding carried out by the processor 202.

The computer system 200 as shown in FIG. 2 may also include additional structures to implement any particular system. For example, the computer system 200 may include a database, and/or a land-line based network communication interface when implementing the server 120, or may include structures similar to those of a mobile terminal or user equipment of a wireless communication system when implementing the mobile device 102, etc. However, the computer system 200 may include or omit any structure to implement any electronic device or apparatus which may require encoding and decoding, or encoding or decoding video. For example, when being configured to implement or include an encoder, the computer system 200 may include the encoding circuit 222 but not the decoding circuit 224; while when being configured to implement or include a decoder, the computer system 200 may include the decoding circuit 224 but not the encoding circuit 222.

Referring again to FIG. 1, the computer system 200 (i.e., any one or more of the variety of devices 102, 104, and/or 106) may capture or collect various data (e.g., audio data, environment/operating data, image data, and/or video data) and send the data to the server 120 through the network 140. The computer system 200 may process or pre-process the data before sending the data to the server 120, or may send the unprocessed data to the server 120.

During operation, a user of a terminal device may use a video application to transmit and/or receive video content to and/or from server 120, or users of the various terminal devices may use various video applications to communicate video content with each other. In one embodiment, one user may communicate video content with another user via the server 120, or the server 120 may set up the communication channel between the users, so that one user may directly communicate video with the other user via the communication channel.

Cross-component filtering (CCF) refers to a filtering process that uses reconstructed samples of a first component (e.g., Y, Cb, or Cr in the YCbCr color space) as input, and the output is applied on a second component that is a different component than the first component. At the encoder, a CCF process can include, e.g., at least one of deriving filtering coefficient(s) or performing filtering. At the decoder, a CCF process can include, e.g., performing filtering.

Figure 3:
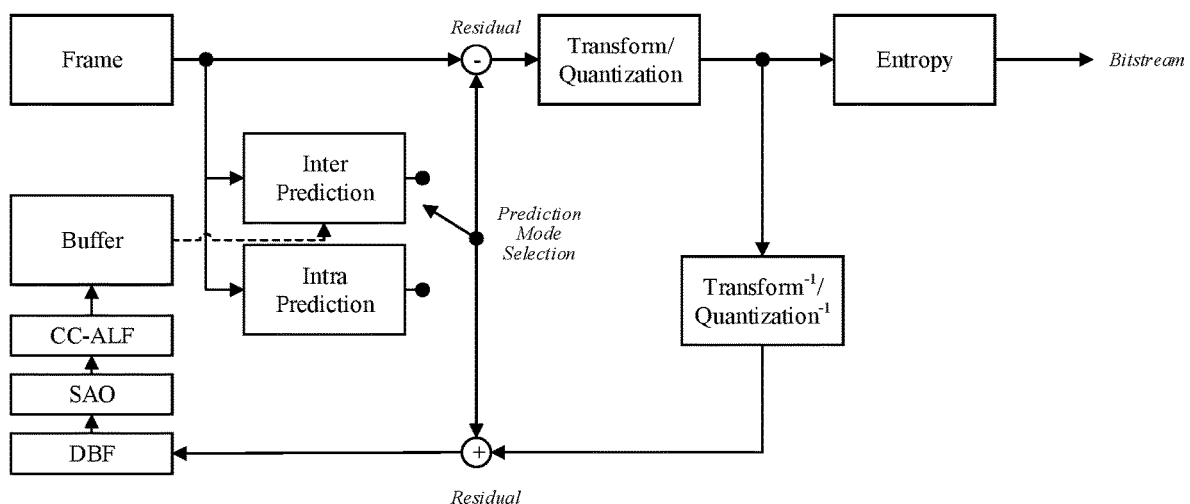
FIG. 3 schematically shows an example HEVC encoding structure with CC-ALF applied.

An example of CCF is cross-component adaptive loop filtering (CC-ALF), which is a specific type of ALF. ALF is often used as a last filtering step in an in-loop filtering process that performs filtering on a reconstructed frame for inter prediction. FIG. 3 schematically shows an example HEVC encoding structure with CC-ALF applied. The encoding process shown in FIG. 3 can be performed at an encoding end (encoder) and can be implemented by, e.g., the encoding circuit 222 alone, the processor 202 alone, the encoding circuit 222 and the processor 202 collectively, or the encoding circuit 222 and/or the processor 202 together with other component(s)/circuit(s) of the computer system 200.

As shown in FIG. 3, an image frame can be processed using inter prediction or intra prediction based on a reference (reference frame or reference block) to obtain residuals, which are then subjected to transform and quantization. The transformed/quantized residuals are entropy-encoded to generate the bitstream for transmitting to the decoding side. The transformed/quantized residuals are also subjected to inverse transform and inverse quantization, and are then combined with the reference frame to obtain a reconstructed frame. The reconstructed frame is fed to the in-loop filter, which includes a deblocking filter (DBF), a sample adaptive offset (SAO) filter, and a cross-component adaptive loop filter (CC-ALF). The filtered frame is stored in the buffer (decoded picture buffer) for using in the inter prediction process of later frames. The coefficients for the CC-ALF are derived at the encoding end, which can be used in the CC-ALF process at the encoding end. The encoding end can transmit the CC-ALF coefficients to the decoding end for using during the corresponding CC-ALF process at the decoding end, or can transmit signaling of the CC-ALF coefficients to the decoding end for the decoding end to select correct CC-ALF coefficients for using in the corresponding CC-ALF process at the decoding end. In some embodiments, the SAO filter can be replaced with, e.g., a constrained directional enhancement filter (CDEF).

At the decoding end (decoder), the decoding process is basically a reverse process of the encoding process shown in FIG. 3. The CC-ALF process at the decoding end can use the CC-ALF coefficients received from the encoding end or CC-ALF coefficients obtained according to the signaling from the encoding end. The decoding process can be implemented by, e.g., the decoding circuit 224 alone, the processor 202 alone, the decoding circuit 224 and the processor 202 collectively, or the decoding circuit 224 and/or the processor 202 together with other component(s)/circuit(s) of the computer system 200.

Figure 4A:
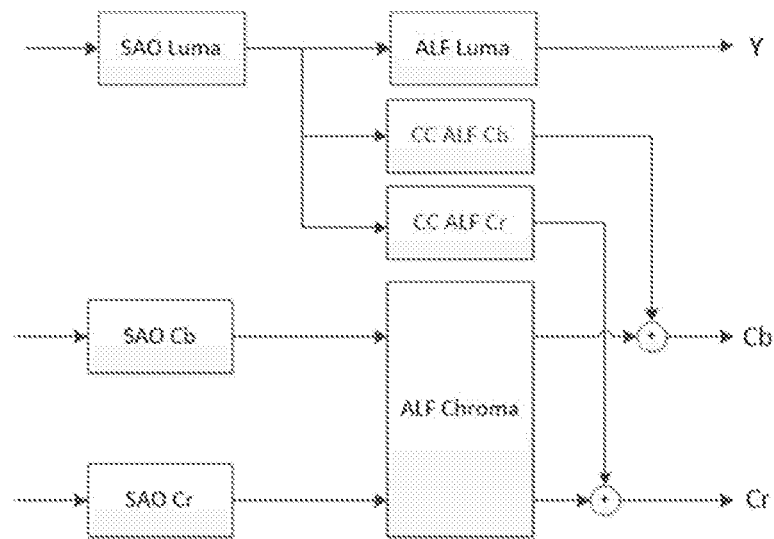
FIG. 4A shows placement of CC-ALF with respect to the other loop filters.
Figure 4B:
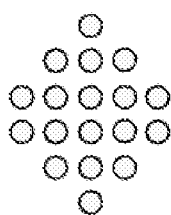
FIG. 4B shows a diamond shaped filter used in CC-ALF.

FIG. 4A illustrates the placement of CC-ALF with respect to the other loop filters. FIG. 4B shows a diamond shaped filter used in CC-ALF. The filter can be a linear filter. As shown in FIG. 4A, CC-ALF applies the filter to the luma channel for each chroma component. The filter coefficients are transmitted in an adaptation parameter set (APS), scaled by a factor of $2^{10}$, and rounded for fixed point representation. In some embodiments, in one APS, up to 25 sets of luma filter coefficients and clipping value indices, and up to eight sets of chroma filter coefficients and clipping value indexes could be signaled. In slice header, the indices of the APSs used for the current slice are signaled. The application of the filters is controlled on a variable block size and signaled by a context-coded flag received for each block of samples. The block size along with a CC-ALF enabling flag is received at the slice-level for each chroma component. Supported block sizes (in chroma samples) include, e.g., 16×16, 32×32, and 64×64.

Table 1 below shows relevant portions of the syntax related to CC-ALF.

alf_cross_component_cr_idc[xCtb>>CtbLog2SizeY] [yCtb>>CtbLog2SizeY]-th cross component Cr filter is applied to the block of Cr color component samples at luma location (xCtb, yCtb).

Example image processing methods consistent with the disclosure will be described below in detail. An image processing method consistent with the disclosure can be performed by an electronic device consistent with the disclosure. The electronic device can be implemented by processing circuitry, e.g., one or more processors or one or more integrated circuits. For example, the electronic device can include one or more processors and a non-transitory computer-readable storage medium storing a program that, when executed by the one or more processors, causes the one or more processors to perform a method consistent with the disclosure, such as one of the example image processing methods described below. In some embodiments, the electronic device can include the computer system 200 shown in FIG. 2 or a part of the computer system 200. For example, if the electronic device is an encoder configured to implement an encoding-related process described below, the electronic device can include, e.g., the encoding circuit 222 and/or the processor 202 as the one or more processors, and

TABLE 1

CC-ALF Syntax

```
if ( slice_cross_component_alf_cb_enabled_flag )
    alf_ctb_cross_component_cb_idc[ xCtb >> CtbLog2SizeY ][ yCtb >> CtbLog2SizeY ]           ae(v)
if( slice_cross_component_alf_cb_enabled_flag = = 0 || alf_ctb_cross_component_cb_idc[ x
Ctb >> CtbLog2SizeY ][ yCtb >> CtbLog2SizeY ] == 0 )
    if( slice_alf_chroma_idc = = 1 || slice_alf_chroma_idc = = 3 ) {
        alf_ctb_flag[ 1 ][ xCtb >> CtbLog2SizeY ][ yCtb >> CtbLog2SizeY ]                    ae(v)
        if( alf_ctb_flag[ 1 ][ xCtb >> CtbLog2SizeY ][ yCtb >> CtbLog2SizeY ]
            && aps_alf_chroma_num_alt_filters_minus1 > 0 )
            alf_ctb_filter_alt_idx[ 0 ][ xCtb >> CtbLog2SizeY ][ yCtb >> CtbLog2SizeY ]      ae(v)
    }
if ( slice_cross_component_alf_cr_enabled_flag )
    alf_ctb_cross_component_cr_idc[ xCtb >> CtbLog2SizeY ][ yCtb >> CtbLog2SizeY ]           ae(v)
if( slice_cross_component_alf_cr_enabled_flag = = 0 || alf_ctb_cross_component_cr_idc[ xC
tb >> CtbLog2SizeY ][ yCtb >> CtbLog2SizeY ] == 0 )
    if( slice_alf_chroma_idc = = 2 || slice_alf_chroma_idc = = 3 ) {
        alf_ctb_flag[ 2 ][ xCtb >> CtbLog2SizeY ][ yCtb >> CtbLog2SizeY ]                    ae(v)
        if( alf_ctb_flag[ 2 ][ xCtb >> CtbLog2SizeY ][ yCtb >> CtbLog2SizeY ]
            && aps_alf_chroma_num_alt_filters_minus1 > 0 )
            alf_ctb_filter_alt_idx[ 1 ][ xCtb >> CtbLog2SizeY ][ yCtb >> CtbLog2SizeY ]      ae(v)
    }
```

The semantics of CC-ALF related syntaxes are as follows:
  alf_ctb_cross_component_cb_idc
    [xCtb>>CtbLog2SizeY][yCtb>>CtbLog2SizeY] equal to 0 indicates that the cross component Cb filter is not applied to block of Cb color component samples at luma location (xCtb, yCtb);
  alf_cross_component_cb_idc[xCtb>>CtbLog2SizeY] [yCtb>>CtbLog2SizeY] not equal to 0 indicates that the
  alf_cross_component_cb_idc[xCtb>>CtbLog2SizeY] [yCtb>>CtbLog2SizeY]-th cross component Cb filter is applied to the block of Cb color component samples at luma location (xCtb, yCtb);
  alf_ctb_cross_component_cr_idc
    [xCtb>>CtbLog2SizeY][yCtb>>CtbLog2SizeY] equal to 0 indicates that the cross component Cr filter is not applied to block of Cr color component samples at luma location (xCtb, yCtb); and
  alf_cross_component_cr_idc[xCtb>>CtbLog2SizeY] [yCtb>>CtbLog2SizeY] not equal to 0 indicates that the the memory 204 as the non-transitory computer-readable storage medium. On the other hand, if the electronic device is a decoder configured to implement a decoding-related process described below, the electronic device can include, e.g., the decoding circuit 224 and/or the processor 202 as the one or more processors, and the memory 204 as the non-transitory computer-readable storage medium. Further, if the electronic device is a codec configured to implement both encoding-related and decoding-related processes, the electronic device can include, e.g., the encoding circuit 222, the decoding circuit 224, and/or the processor 202 as the one or more processors, and the memory 204 as the non-transitory computer-readable storage medium.

In some embodiments of the disclosure, statistics information of a sample area can be obtained/derived and used for further determination. Depending on the processing, a sample area can refer to a specific area related to the processing. For example, in CCF-related processing, a sample area can refer to an area on which CCF may be further applied. Depending on the specific application scenario, the sample area can be an image frame (such as an image frame obtained by an image acquisition device, e.g., the camera 226 of the computer system 200) or a portion of an image frame, or a processed (e.g., reconstructed) image frame or a portion of a processed image frame. For example, the sample area can include a block or a portion of a block. A block can be a 4×4 block (i.e., including a pixel array of 4 pixels by 4 pixels), an 8×8 block, a 16×16 block, or a 32×32 block.

Further, an image frame can be presented in a color space having different components. For example, in the YCbCr color space, an image frame (or a portion thereof) can be decomposed into a luma component (Y) and two chroma components (Cb and Cr).

Therefore, for each block in the image, there are one luma block (Y block) containing the luma information of the block and two chroma blocks (Cb block and Cr block) containing the chroma information of the block.

Various information/data can be used as the statistic information, as described in more detail below. In some embodiments, the statistics information can include smoothness information, i.e., a measurement of a smoothness of reconstructed samples within a sample area. Reconstructed samples can be obtained, e.g., during the encoding process described above in connection with FIG. 3, or during a decoding process. In some embodiments, the smoothness of the sample area can be measured according to pixel values within the sample area. A pixel value of a pixel can include, for example, at least a luma component value or a chroma component value at the pixel.

In some embodiments, the smoothness of the sample area can be computed by a range of pixel values within the sample area. The range of pixel values can be, for example, an absolute difference between a maximum pixel value and a minimum pixel value within the sample area.

In some embodiments, the smoothness of the sample area can be computed by an interquartile range of pixel values within the sample area. The interquartile range of pixel values can be, for example, an absolute difference between a first percentile and a second percentile of pixel values within the sample area. The first percentile can be, e.g., 75%, and the second percentile can be, e.g., 25%.

In some embodiments, the smoothness of the sample area can be computed by a variance of pixel values within the sample area. For example, assume the sample area includes n samples, e.g., pixels, then the variance $S^2$ of the pixel values within the sample area can be computed as follows:

$$S^2 = \frac{\sum_{i=1}^{n}(x_i - \bar{x})^2}{n-1} \quad (1)$$

where i is an integer having a value from 1 to n and represents the i-th sample in the sample area, $x_i$ denotes the pixel value of the i-th sample, $\bar{x}$ denotes the mean (average) pixel value across the n samples.

In some embodiment, instead of the variance $S^2$ of the pixel values within the sample area, a standard deviation S of the pixel values within the sample area can be used to compute the smoothness of the sample area. The standard deviation S of the pixel values within the sample area is the square root of the variance $S^2$ of the pixel values within the sample area.

In some embodiments, instead of or in addition to the above parameters that are directly computed using pixel values at various pixels, parameters that are computed using derived values at various pixels can be used to represent the smoothness of the sample area. A derived value of a pixel refers to a value derived based on pixel value of the pixel and/or pixel values of neighboring pixels. For example, the derived value of a pixel can be a gradient value of the pixel, which can be calculated as, e.g., a difference between the pixel value of the pixel and the pixel value of a neighboring pixel, or can be calculated as a difference between the pixel values of two neighboring pixels that are on opposite sides of the pixel.

Computation of the smoothness of the sample area using the derived values, e.g., the gradient values, can be similar to the computation of the smoothness of the sample area using the pixel values as described above. For example, the smoothness of the sample area can be computed by the range of gradient values (absolute difference between the maximum and the minimum gradient values) within the sample area, the interquartile range of gradient values within the sample area, the variance of gradient values within the sample area, and/or the standard deviation of gradient values within the sample area.

Instead of or in addition to the smoothness information described above, other types of information can be used as the statistics information. In some embodiments, the statistics information can include information that is generated after the encoder makes mode decisions and is transmitted to the decoder for use by the decoder during the decoding process. Such information can also be referred to as "mode information." The mode information can be coded (e.g., compressed and signaled) by the encoder before being transmitted. The mode information can be coded using, e.g., binary bits, i.e., a specific binary bit or combination of binary bits can be used to represent a specific piece of mode information. The information representing coding of the mode information is also referred to as "coded information." When the decoder receives the coded information, the decoder can parse the coded information to obtain the mode information.

In some embodiments, the mode information can include at least one of a prediction mode signaled for the block, information related to coefficients coding (such as coded block flag (CBF)), a block size, a quantization parameter (QP), the CCF flag (indicating on/off of CCF) of another image frame (such as a reference frame), or a motion vector (magnitude) associated with the block. The prediction mode can be an intra DC (direct current) mode, an intra Planar mode, an intra Paeth mode, an intra Smooth mode, an intra recursive filtering mode, or an inter skip mode.

The statistics information can also additionally or alternatively include information available at both the encoder and the decoder for a specific process, e.g., when applying CCF. Since such information is available for both the encoder and the decoder, there is no need to transmit this information from the encoder to the decoder. Hereinafter, such information is also referred to as "intermediate information." The intermediate information can include, for example, at least one of sample classification information derived during loop filtering process (e.g., ALF), filtering strength derived during deblocking process, CDEF, or Loop restoration, or edge direction derived in CDEF.

Figure 5:
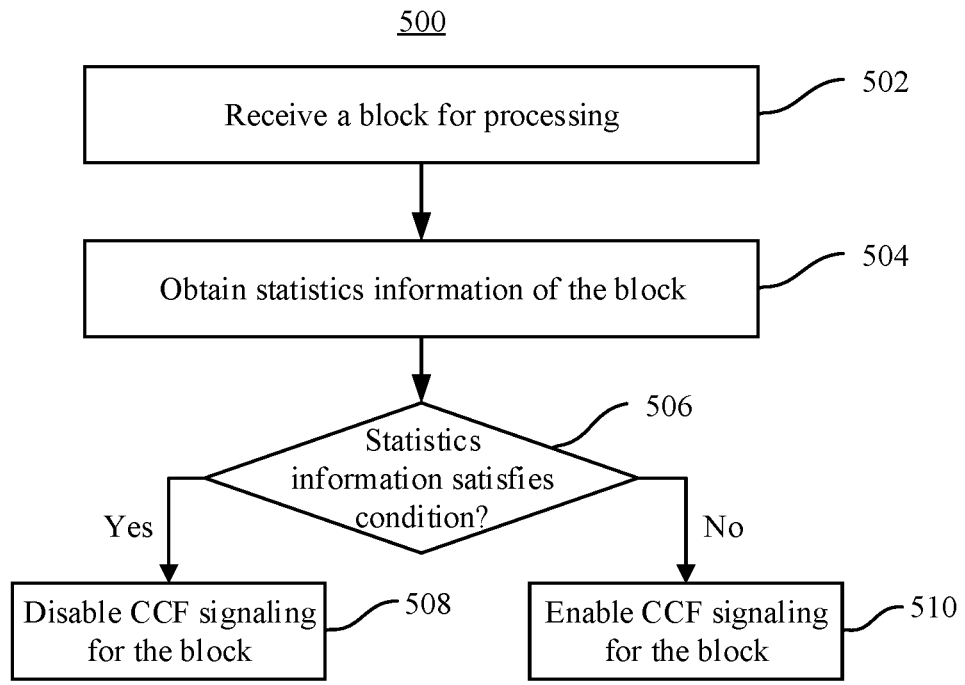
FIG. 5 is a flow chart showing an example image processing method consistent with the disclosure.

FIG. 5 is a flow chart showing an example image processing method 500 consistent with the disclosure. The method 500 can be performed by an electronic device implementing an encoder, e.g., the computer system 200 or a part of the computer system 200 as described above. As shown in FIG. 5, at 502, a block for processing (also referred to as a current block) is received. At 504, statistics information of the block is obtained. At 506, whether the statistics information satisfying a condition is determined. If the statistics information satisfies the condition (506:Yes), CCF signaling is disabled for the current block (508). On the other hand, if the statistics information does not satisfy the condition (506:No), CCF signaling is enabled for the current block (510). That is, according to the example method 500, CCF signaling is enabled for the current block in response to the statistics information of the current block satisfying the condition.

The block for processing can be a portion of an image frame as described above. The image frame can be obtained by an image acquisition device, such as the camera 226 of the computer system 200.

Determination of whether to signal CCF or CCF signaling itself can be made in the unit of a portion of the image frame. Such portion of the image frame is also referred to as a "CCF signaling unit" or simply "signaling unit." In some embodiments, whether to signal CCF can be determined and/or CCF signaling can be performed at the block level, i.e., a block can be a signaling unit. In some other embodiments, the signaling unit can be larger than or smaller than a block. For example, the signaling unit can be a region including a plurality of blocks or a region including a fraction of a block (e.g., a sub-block).

CCF signaling refers to a mechanism providing for, e.g., whether CCF will be performed and how CCF-related information is transmitted by the encoder and received by the decoder. Enabling CCF signaling can be realized by, e.g., including a CCF flag in the bitstream transmitted from the encoder to the decoder. For example, the CCF flag for a block can be included in a block header (header part of the data packet for a block) corresponding to the block in the bitstream. When the CCF flag is true, the decoder can know that CCF needs to be performed on the block. On the other hand, when the CCF flag is false, the decoder can know that CCF is not needed for the block.

Correspondingly, disabling CCF signaling can be realized by, e.g., not including the CCF flag in the bitstream transmitted from the encoder to the decoder. For example, when no CCF flag is included in the block header corresponding to the block in the bitstream, it indicates that CCF signaling for the block is disabled. In some embodiments, when the decoder does not receive the CCF flag for the block, i.e., when the decoder detects that the CCF signaling is not applied to the block, the decoder can perform a default action on the block. The default action can be, for example, turning off CCF for the block, i.e., not performing CCF on the block.

As shown in FIG. 5 and described above, the electronic device can determine whether to disable CCF signaling for the block according to whether the statistics information satisfies a condition. The condition can be different for different types of statistics information. For example, if the statistics information includes the smoothness information, the condition can include a predetermined threshold. In this scenario, disabling CCF signaling for the block in response to the statistics information satisfying a condition (508) can include disabling CCF signaling for the block in response to the smoothness of the block being smaller than the predetermined threshold or greater than the predetermined threshold, for example, in response to the absolute difference between the maximum and minimum pixel values or gradient values of the block being smaller than a predetermined threshold.

If the statistics information includes the mode information, the condition can include predetermined information or a predetermined value representing specific mode information. In this scenario, disabling CCF signaling for the block in response to the statistics information satisfying a condition (508) can include disabling CCF signaling for the block in response to the mode information being the predetermined information, which, for example, can be determined as the coded information corresponding to the mode information being identified as equaling the predetermined value. For example, the CCF signaling for the block can be disabled in response to determining that the block is coded by the intra DC mode.

If the statistics information includes the intermediate information, the condition can include predetermined information or a predetermined value representing specific intermediate information. In this scenario, disabling CCF signaling for the block in response to the statistics information satisfying a condition (508) can include disabling CCF signaling for the block in response to the intermediate information being the predetermined information, which, for example, can be determined as the intermediate information being identified as equaling the predetermined value. For example, the CCF signaling for the block can be disabled in response to determining that a CDEF filtering strength of the block is 0.

In some embodiments, the method can further include generating the data packet corresponding to the block that is to be included in the bitstream for transmitting from the encoder to the decoder. Disabling CCF signaling for the block at 508 can include determining not to include the CCF flag in the block header of the data packet corresponding to the block.

Consistent with the disclosure, for example, according to the example methods described above, in some scenarios, when certain condition is satisfied, CCF flag and/or other CCF-related information does not need to be sent to the decoder. Therefore, less information needs to be coded and transmitted from the encoder to the decoder, and coding efficiency can be improved. Further, less storage space and transmission bandwidth are needed, and the overall efficiency of the image processing can be improved.

In addition to determining whether to signal CCF and/or whether to enable CCF process, the encoder can also derive CCF coefficients and signal the CCF coefficients to the decoder. In some embodiments, the encoder can exclude one or more samples (e.g., one or more pixels) from a block according to the statistics information of the block, as described in more detail below.

Figure 6:
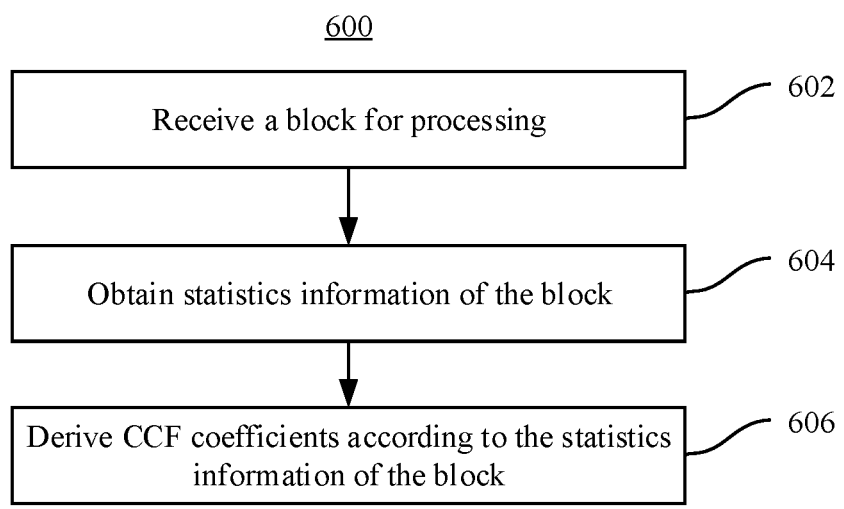
FIG. 6 is a flow chart showing another example image processing method consistent with the disclosure.

FIG. 6 is a flow chart showing an example image processing method 600 consistent with the disclosure. The method 600 can be performed by an electronic device implementing an encoder, e.g., the computer system 200 or a part of the computer system 200 as described above. As shown in FIG. 6, at 602, a block for processing (also referred to as a current block) is received. At 604, statistics information of the block is obtained. At 606, CCF coefficients are derived according to the statistics information of the block. In some embodiments, deriving the CCF coefficients according to the statistics information of the block can include excluding one or more samples (e.g., one or more pixels) of the block from the process of deriving the CCF coefficients in response to the statistics information of the block satisfying a condition. The statistics information can be any one of the above-described types of statistics information. The condition can be different for different types of statistics information.

If the statistics information includes the smoothness information, the condition can include a predetermined threshold. In this scenario, excluding the one or more samples from the process of deriving the CCF coefficients can include excluding the one or more samples in response to the smoothness of the block being smaller than the predetermined threshold or greater than the predetermined threshold, for example, in response to the absolute difference between the maximum and minimum pixel values or gradient values of the block being smaller than a predetermined threshold.

If the statistics information includes the mode information, the condition can include predetermined information or a predetermined value representing specific mode information. In this scenario, excluding the one or more samples from the process of deriving the CCF coefficients can include excluding the one or more samples in response to the mode information being the predetermined information, which, for example, can be determined as the coded information corresponding to the mode information being identified as equaling the predetermined value. For example, the one or more samples can be excluded from the process of deriving the CCF coefficients in response to determining that the block is coded by the intra DC mode.

If the statistics information includes the intermediate information, the condition can include predetermined information or a predetermined value representing specific intermediate information. In this scenario, excluding the one or more samples from the process of deriving the CCF coefficients can include excluding the one or more samples in response to the intermediate information being the predetermined information, which, for example, can be determined as the intermediate information being identified as equaling the predetermined value. For example, the one or more samples can be excluded from the process of deriving the CCF coefficients in response to determining that a CDEF filtering strength of the block is 0.

In some embodiments, excluding the one or more samples from the process of deriving the CCF coefficients can include excluding all pixels from the block when deriving the CCF coefficients. For example, if the CDEF filtering strength of the block is 0, then all pixels from the block can be excluded from the process of deriving the CCF coefficients, i.e., all pixels from the block are not used for deriving the CCF coefficients.

In some embodiments, when the statistics information of the block satisfies the condition, a further determination is made as to what pixels of the block are excluded from the process of deriving the CCF coefficients. That is, the pixels from the block may be partially excluded when deriving the CCF coefficients, depending on the further determination result. For example, when an edge direction is identified in the block in CDEF, then only the pixels along the edge within the block are used to derive the CCF coefficients and other pixels not on the edge are excluded from the process of deriving the CCF coefficients.

Figure 7:
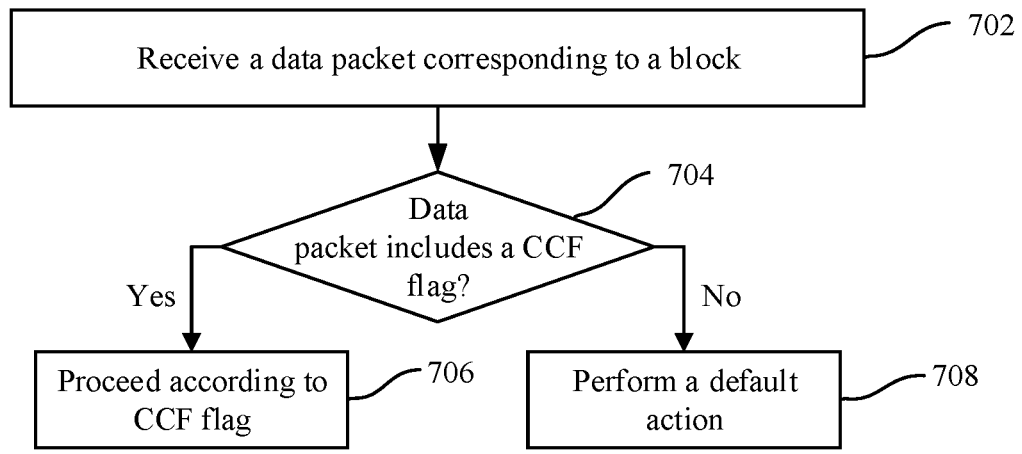
FIG. 7 is a flow chart showing another example image processing method consistent with the disclosure.

FIG. 7 is a flow chart showing another example image processing method 700 consistent with the disclosure. The method 700 can be performed by an electronic device implementing a decoder, e.g., the computer system 200 or a part of the computer system 200 as described above. As shown in FIG. 7, at 702, a data packet corresponding to a block (a current block) is received. At 704, whether the data packet includes a CCF flag is determined. If the data packet includes a CCF flag (704:Yes), the data packet is processed according to the CCF flag (706), e.g., CCF is performed or not performed for the block according to whether the CCF is signaled as on (i.e., whether the CCF flag is true). On the other hand, if the data packet does not include a CCF flag (704:No), then a default action is performed for the block (708).

In some embodiments, determining whether the data packet includes a CCF flag (704) can include determining whether a block header of the data packet includes a CCF flag. In some embodiments, the default action can include turning off CCF (determining not to perform CCF) for the block during the process of reconstructing the block. That is, if it is determined that the data packet does not include a CCF flag, CCF is not performed for the block when the block is being reconstructed.

In the embodiments described above in connection with FIG. 7, when CCF is not signaled, a default action, e.g., turning off CCF, is performed at the decoder. In some other embodiments, the decoder can determine whether to perform CCF for a region based on certain statistics information of the region that is used by the encoder to determine whether to signal CCF, as described in more detail below. That is, even if a region is not signaled, the decoder can derive the value of the CCF flag should it have been transmitted based on such statistics information and CCF for the region is not necessarily disabled. In some embodiments, mode information of a region can be used for this purpose.

Figure 8:
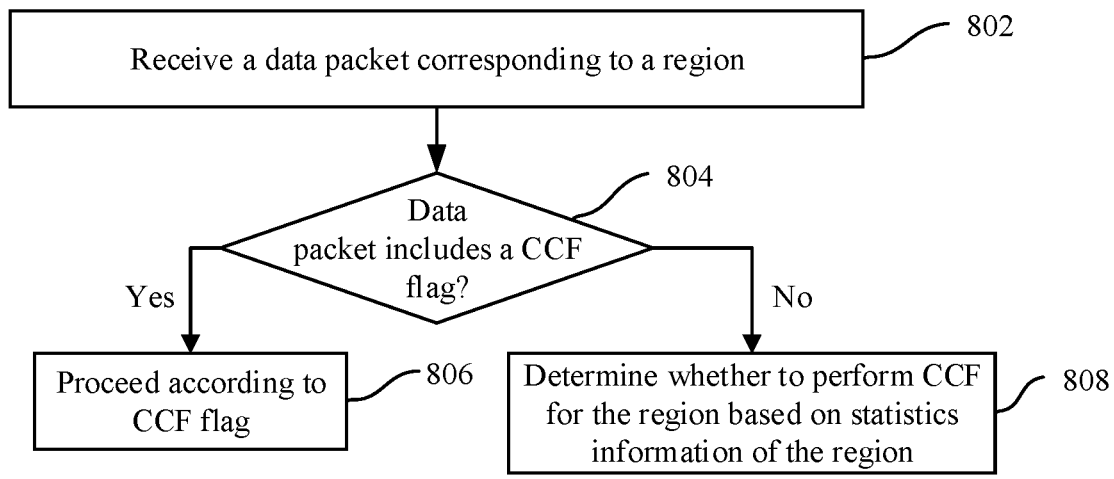
FIG. 8 is a flow chart showing another example image processing method consistent with the disclosure.

FIG. 8 is a flow chart showing another example image processing method 800 consistent with the disclosure. The method 800 can be performed by an electronic device implementing a decoder, e.g., the computer system 200 or a part of the computer system 200 as described above. As shown in FIG. 8, at 802, a data packet corresponding to a region (a current region) is received. The region can be a portion of an image frame and can include a plurality of blocks. At 804, whether the data packet includes a CCF flag is determined. If the data packet includes a CCF flag (804:Yes), the data packet is processed according to the CCF flag (806), e.g., CCF is performed or not performed for the region according to whether the CCF flag is true or false. On the other hand, if the data packet does not include a CCF flag (804:No), then whether to perform CCF for the region is determined based on statistics information of the region (808). In some embodiments, the statistics information of the region can include mode information of the blocks or pixels in the region.

The encoder-side processes corresponding to the decoder-side processes shown in FIG. 8 can be similar to the encoder-side processes of the example methods described above, such as the example method shown in FIG. 5, except that the example method shown in FIG. 5 is described using a block as an example of the signaling unit while the encoder-side processes corresponding to the decoder-side processes shown in FIG. 8 can determine whether to signal CCF for a region including a plurality of blocks. That is, the encoder can determine whether to signal CCF based on statistics information of the region, and for a region without CCF signaling, the decoder can determine whether to perform CCF based on the same statistics information.

In some embodiments, the above-described determination (determination of whether to signal CCF by the encoder or determination of whether to perform CCF by the decoder) can be made according to the amount of blocks or pixels coded by a specific mode in the region, such as the percentage of blocks or pixels coded by the specific mode in the region. For example, if the encoder determines that a percentage of blocks or pixels coded by a specific mode (e.g., a skip mode) in the region is greater than a threshold, the encoder can determine not to signal CCF for the region. Correspondingly, when the decoder determines that the percentage of blocks or pixels coded by the specific mode (e.g., the skip mode) in the region is greater than the threshold, the decoder can determine not to perform CCF for the region. That is, determining whether to perform CCF for the region (708) can include determining not to perform CCF for the region in response to determining that the percentage of the blocks or pixels coded by the specific mode (e.g., the skip mode) in the region is greater than the threshold.

As another example, if the encoder determines that a percentage of blocks or pixels coded by a specific mode (e.g., an intra mode) in the region is greater than a threshold, the encoder can determine not to signal CCF for the region. Correspondingly, when the decoder determines that the percentage of blocks or pixels coded by the specific mode (e.g., the intra mode) in the region is greater than the threshold, the decoder can determine to perform CCF for the region. That is, determining whether to perform CCF for the region (808) can include determining to perform CCF for the region in response to determining that the percentage of the blocks or pixels coded by the specific mode (e.g., the intra mode) in the region is greater than the threshold.

The percentage of the blocks or pixels coded by the specific mode as discussed above can be computed according to area size, i.e., the area size of the blocks or pixels coded by the specific mode as percentage of the total area size of the region. In some embodiments, the percentage of the blocks or pixels coded by the specific mode can be computed according to number, i.e., the number of blocks or pixels coded by the specific mode as percentage of the total number of blocks or pixels in the region. The threshold can be, for example, in a range from 40% to 60%.

In some embodiments, the above-described determination (determination of whether to signal CCF by the encoder or determination of whether to perform CCF by the decoder) can be made according to the block size in the region, such as the maximum block size in the region. For example, if the encoder determines that the maximum block size in the region is smaller than a threshold, the encoder can determine not to signal CCF for the region. Correspondingly, when the decoder determines that the maximum block size in the region is smaller than the threshold, the decoder can determine to perform CCF for the region. That is, determining whether to perform CCF for the region (808) can include determining to perform CCF for the region in response to determining that the maximum block size in the region is smaller than the threshold. The threshold can be, e.g., 32 pixels or 64 pixels.

In some embodiments, when whether to perform CCF for a signaling unit (e.g., a block) is signaled to the decoder (e.g., when CCF signaling is enabled according to a method consistent with the disclosure, such as one of the example methods described above, or when CCF signaling is enabled by default), the decoder can perform further action according to the CCF signaling. For example, when the CCF flag that the decoder receives for a signaling unit is signaled to be off, the decoder can determine that the signaling unit includes a smooth area and disable CCF for the entire signaling unit. In some embodiments, when the CCF flag that the decoder receives for a signaling unit is signaled to be on, the decoder can further determine whether CCF needs to be performed for the signaling unit, a smaller area (e.g., a sub-block) in the signaling unit, or a color component, as described in more detail below.

Figure 9:
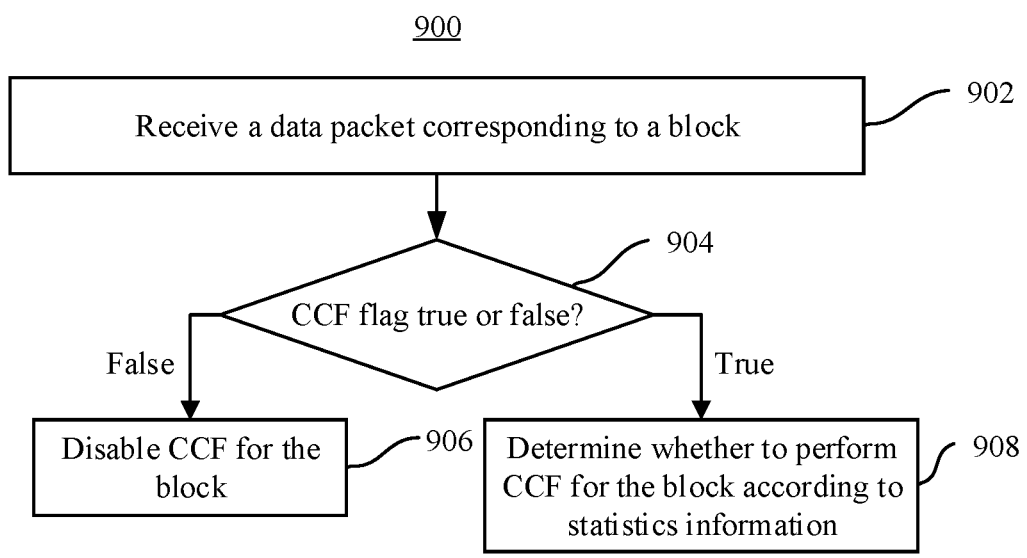
FIG. 9 is a flow chart showing another example image processing method consistent with the disclosure.

FIG. 9 is a flow chart showing another example image processing method 900 consistent with the disclosure. The method 900 can be performed by an electronic device implementing a decoder, e.g., the computer system 200 or a part of the computer system 200 as described above. As shown in FIG. 9, at 902, a data packet corresponding to a block (a current block) is received. At 904, whether a CCF flag included in the data packet is true or false is determined. The CCF flag being true indicates that the CCF is signaled as on for the block and the CCF flag being false indicates that the CCF is signaled as off for the block. If the CCF flag is false (904:False), it is determined that no CCF is to be performed for the block (906), i.e., CCF is disabled for the block. On the other hand, if the CCF flag is true 904:True), whether to perform CCF for the block (i.e., whether to enable or disable CCF for the block) is determined according to statistics information of the block (908). The decoder can perform further action, e.g., performing CCF for the block, a portion (a sub-block) of the block, or a color component of the block, according to the determination result, as described in more detail below. The statistics information can be any one of the above-described types of statistics information.

In some embodiments, determining whether to perform CCF for the block (908) can include determining whether to perform CCF on the block as a whole. In some embodiments, whether to perform CCF for the block can be determined according to whether the statistics information of the block satisfies a condition. The determination of whether the statistics information of the block satisfying the condition is similar to the determination process described above in connection with FIG. 5. The difference is that, in the process of FIG. 5, the determination result is used to control whether to signal CCF, while in the process of FIG. 9, the determination result is used to control whether to perform CCF.

For example, if the statistics information includes the smoothness information, the condition can include a predetermined threshold. In this scenario, determining whether to perform CCF for the block can include determining not to perform CCF (disabling CCF) on the block in response to the smoothness of the block being smaller than the predetermined threshold or greater than the predetermined threshold, for example, in response to the absolute difference between the maximum and minimum pixel values or gradient values of the block being smaller than a predetermined threshold.

If the statistics information includes the mode information, the condition can include predetermined information or a predetermined value representing specific mode information. In this scenario, determining whether to perform CCF for the block can include determining not to perform CCF on the block in response to the mode information being the predetermined information, which, for example, can be determined as the coded information corresponding to the mode information being identified as equaling the predetermined value. For example, CCF for the block can be disabled in response to determining that the block is coded by the intra DC mode.

If the statistics information includes the intermediate information, the condition can include predetermined information or a predetermined value representing specific intermediate information. In this scenario, determining whether to perform CCF for the block can include determining not to perform CCF on the block in response to the intermediate information being the predetermined information, which, for example, can be determined as the intermediate information being identified as equaling the predetermined value. For example, CCF for the block can be disabled in response to determining that a CDEF filtering strength of the block is 0.

In some embodiments, determining whether to perform CCF for the block (908) can include determining whether to perform CCF on a sub-block of the block. The sub-block can be a portion of the block, such as ½, ⅓, ¼, ⅙, ⅛, ¹⁄₁₆, or ¹⁄₃₂ of the block. That is, even if the CCF flag on the block level is true, for each sub-block of the block, whether to perform CCF can still be determined separately according to the statistics information of the sub-block. The determination of the statistics information of a sub-block and the condition for whether to perform CCF on the sub-block are similar to those described above in regard to the same for the block, except that the same determination is made on the sub-block level.

In some embodiments, determining whether to perform CCF for the block can include determining whether to perform CCF on the block or the sub-block in each of the color components. Each color component in the block or the sub-block may have corresponding statistics information, which can be different from the statistics information of another color component.

In some embodiments, the statistics-based CCF determination can be performed for one color component, and the determination conclusion can be applied to the other color components directly. That is, the decoder may only need to determine the statistics information for one color component in the block or the sub-block. The decoder can then determine whether to perform CCF in that color component according to the statistics information of that color component, and apply the same determination conclusion to other color components. For example, if the decoder disables CCF for the block or the sub-block in one color component (i.e., determines not to perform CCF for the block or the sub-block in that color component) according to the statistics information of that color component, the decoder also disables CCF for the block or the sub-block in other color components. As a specific example, if CCF is disabled for the block or the sub-block in the Cb component, then CCF is also disabled for the block or the sub-block in the Cr component.

In some embodiments, determination of whether to perform CCF on the block or the sub-block in different color components is not correlated. That is, the statistics-based CCF determination can be performed for each of the color components, and the CCF on/off for the block or the sub-block in one color component does not affect the CCF on/off for the block or the sub-block in other color components. Thus, the decoder may need to determine the statistics information for each color component in the block or the sub-block, and then determine whether to perform CCF in each color component according to the statistics information of the corresponding color component. For example, if the decoder disables CCF for the block or the sub-block in one color component (i.e., determines not to perform CCF for the block or the sub-block in that color component) according to the statistics information of that color component, the decoder still needs to further determine whether to enable or disable CCF for the block or the sub-block in other color components. As a specific example, if CCF is disabled for the block or the sub-block in the Cb component, CCF may be enabled or disabled for the block or the sub-block in the Cr component, based on the statistics information for the Cr component.

According to the embodiments described above, processing time in the image processing can be reduced. For example, less time is needed to determine whether a region is a smooth region according to the statistics information. Therefore, the image processing speed and overall efficiency are improved.

In some embodiments, even if the CCF flag for a region (e.g., a region including a plurality of blocks) is true, pixels from a block in the region can still be excluded from the CCF process, as described in more detail below. As described above, at the encoder end, the CCF process can include at least one of deriving the CCF coefficients or performing CCF, and at the decoder end, the CCF process can include performing CCF. Exclusion of the pixels from the CCF process can occur at both the encoder and the decoder.

Figure 10A:
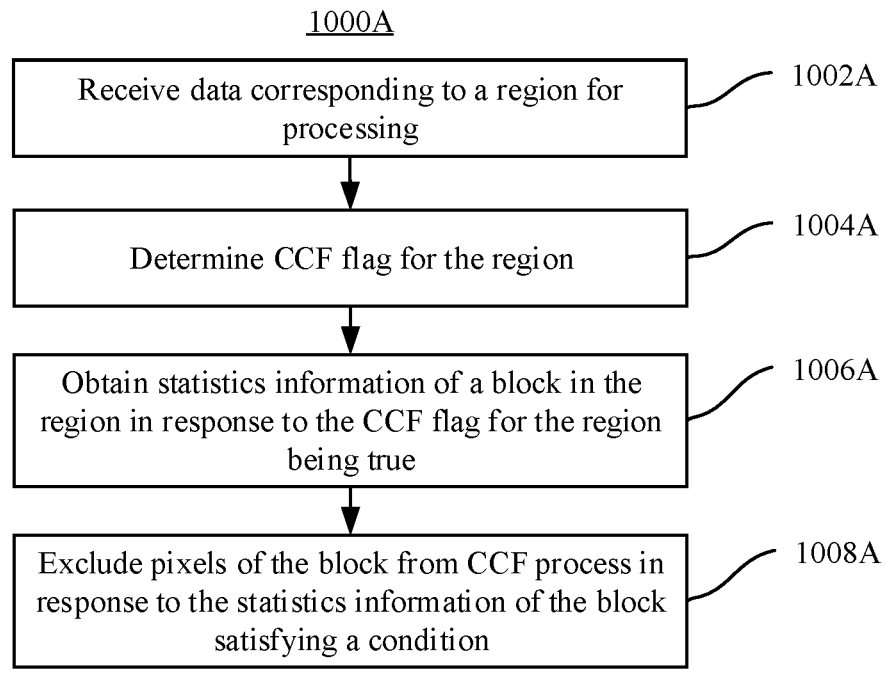
FIG. 10A is a flow chart showing another example image processing method consistent with the disclosure.

FIG. 10A is a flow chart showing an example image processing method 1000A consistent with the disclosure. The method 1000A can be performed by an electronic device implementing an encoder, e.g., the computer system 200 or a part of the computer system 200 as described above. As shown in FIG. 10A, at 1002A, data corresponding to a region for processing (also referred to as a current region) is received. The region can include a plurality of blocks. At 1004A, a CCF flag for the region is determined. The CCF flag for the region can be determined according to a method consistent with the disclosure. At 1006A, statistics information of a block in the region is obtained in response to the CCF flag for the region being true. The statistics information of the block can include mode information of the block, such as prediction mode (i.e., whether intra DC mode, intra Planar mode, intra Paeth mode, intra Smooth mode, intra recursive filtering mode, inter skip modes are applied), the information related to coefficients coding (such as CBF), the block size, QP, the CCF flag of another image frame (such as a reference frame), and/or a motion vector (magnitude) associated with the block. At 1008A, pixels from the block are excluded from the CCF process in response to the statistics information satisfying a condition, e.g., when the mode information of the block satisfies a condition.

Figure 10B:
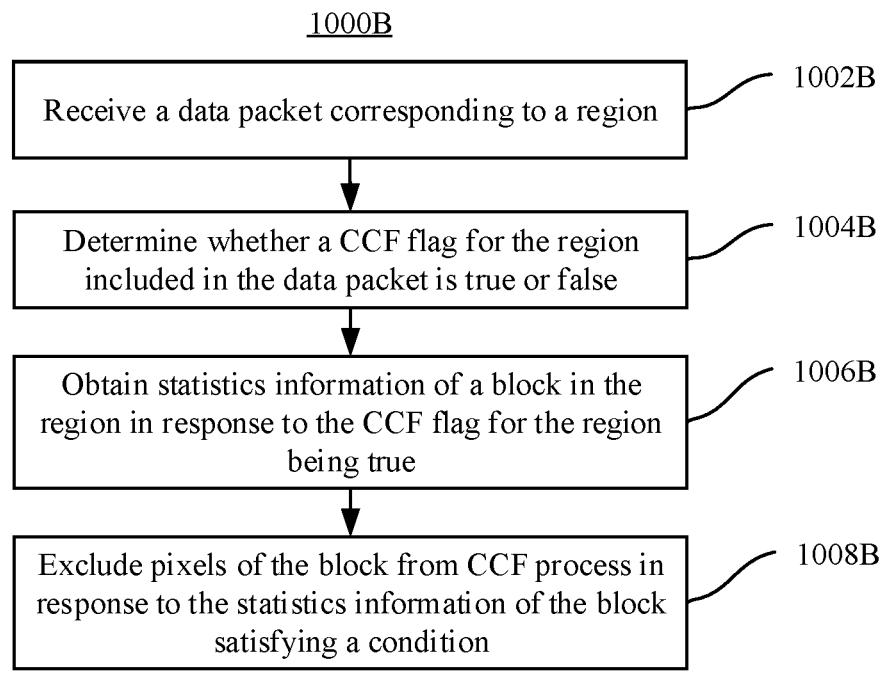
FIG. 10B is a flow chart showing another example image processing method consistent with the disclosure.

Correspondingly, FIG. 10B shows an example image processing method 1000B consistent with the disclosure that can be performed by an electronic device implementing a decoder, e.g., the computer system 200 or a part of the computer system 200 as described above. As shown in FIG. 10B, at 1002B, a data packet corresponding to a region (also referred to as a current region) is received. The region can include a plurality of blocks. At 1004B, whether a CCF flag for the region included in the data packet is true or false is determined. At 1006B, statistics information of a block in the region is obtained in response to the CCF flag for the region being true. The statistics information of the block can include coded information corresponding to the mode information of the block. At 1008B, pixels from the block are excluded from the CCF process in response to the statistics information satisfying a condition, e.g., when the coded information of the block satisfies a condition.

Various mode/coded information and conditions can be used in processes 1006A/1006B and 1008A/1008B to determine whether to exclude the pixels of a block. For example, if the prediction mode for the block is skip mode, the pixels in the block are excluded from the CCF process (at the encoder and/or the decoder). As another example, if the CBF flag of the luma and/or chroma component of the block is zero, the pixels in the block are excluded from the CCF process (at the encoder and/or the decoder). As a further example, if the luma or chroma component of the block is coded with a non-directional intra prediction mode, such as a planar, a DC, or a smooth (AV1) mode, the pixels in the block are excluded from the CCF process (at the encoder and/or the decoder).

Figure 11A:
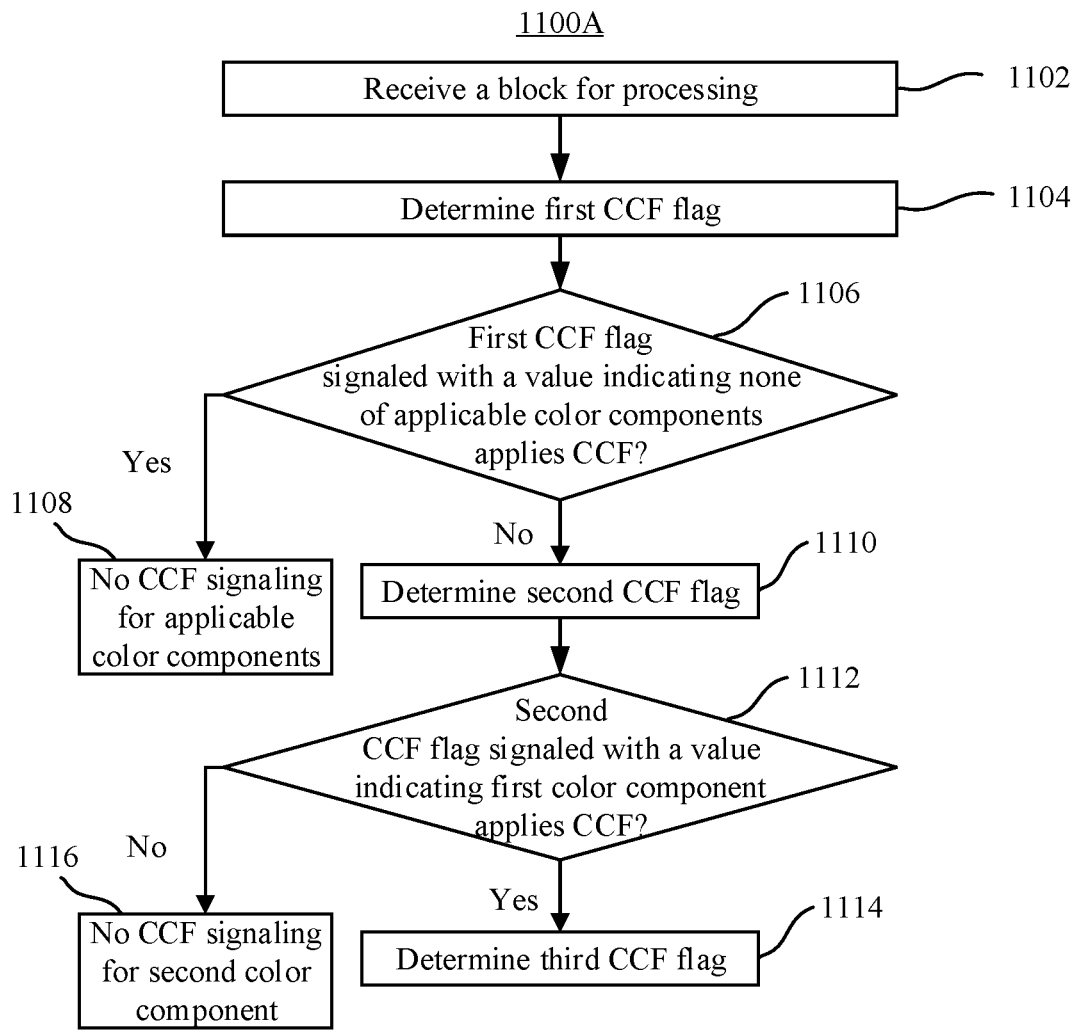
FIG. 11A is a flow chart showing another example image processing method consistent with the disclosure.

CCF signaling, e.g., at the block level can be performed for each color component of the block, and hence one or more CCF flags may be signaled for the block. FIG. 11A is a flow chart showing an example image processing method 1100A consistent with the disclosure. The method 1100A can be performed by an electronic device implementing an encoder, e.g., the computer system 200 or a part of the computer system 200 as described above, for, e.g., determining CCF signaling for various color components of a block.

As shown in FIG. 11A, at 1102, a block (also referred to as a current block) for processing is received. At 1104, a first CCF flag (also referred to as a "joint CCF flag") is determined for all applicable color components of the block. The color components of the block can include, e.g., Cb component and Cr component. The first CCF flag can be signaled to indicate whether all applicable color components apply CCF.

At 1106, whether the first CCF flag is signaled with a value that indicates none of the applicable color components applies CCF is determined. If the first CCF flag is signaled with the value that indicates none of the applicable color components applies CCF (1106:Yes), then no further determination of whether CCF signaling is performed for individual color component is needed (1108). On the other hand, if the first CCF flag is not signaled with the value that indicates none of the applicable color components applies CCF (1106:No), e.g., if the first CCF flag is signaled with a value that indicates at least one of the applicable color components of the block applies CCF, then a second CCF flag is determined for a first color component (e.g., the Cb component) of the applicable color components (1110).

At 1112, whether the second CCF flag is signaled with a value that indicates the first color component applies CCF is determined. If the second CCF flag is signaled with the value that indicates the first color component applies CCF (1112: Yes), then a third CCF flag is determined for a second color component (e.g., the Cr component) of the applicable color components (1114) where the third CCF flag is signaled with a value that indicates whether the second color component applies CCF. On the other hand, if the second CCF flag is not signaled with the value that indicates the first color component applies CCF (1112:No), e.g., if the second CCF flag is signaled with a value that indicates the first color component does not apply CCF, then it is determined that no further CCF signaling is needed for the second color component (1116).

Figure 11B:
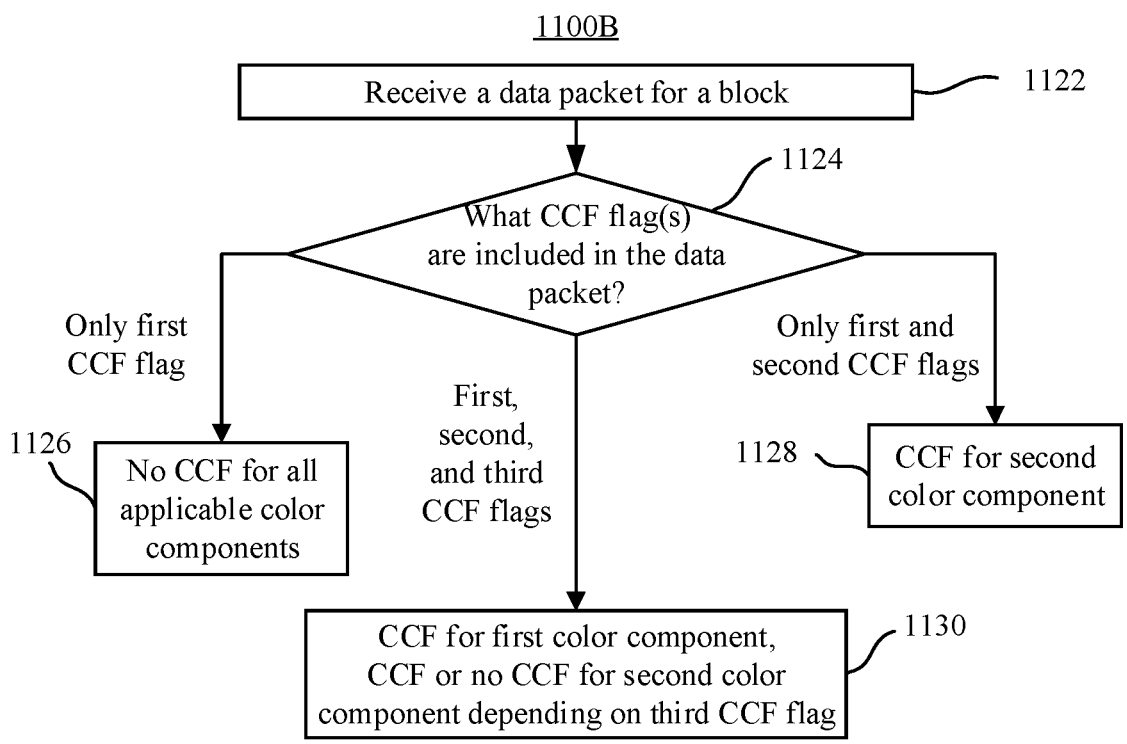
FIG. 11B is a flow chart showing another example image processing method consistent with the disclosure.

FIG. 11B is a flow chart showing an example image processing method 1100B consistent with the disclosure. The method 1100B can be performed by an electronic device implementing a decoder, e.g., the computer system 200 or a part of the computer system 200 as described above, for, e.g., determining whether to perform CCF for various color components of a block.

As shown in FIG. 11B, at 1122, a data packet for a block (also referred to as a current block) is received. The data packet can include one or more CCF flags for the applicable color components of the block as determined above according to the method 1100A. For example, the data packet can include at least the first CCF flag, and may further include the second CCF flag and the third CCF flag depending on the encoding processes at the encoder. At 1124, what CCF flag(s) are included in the data packet is determined. If the data packet only includes the first CCF flag, then based on the encoder-side processes described above, the first CCF flag will have a value that indicates none of the applicable color components applies CCF, and hence no CCF is performed for all the applicable color components (1126). If the data packet only includes the first CCF flag and the second CCF flag, then based on the encoder-side processes described above, the first CCF flag will have a value that indicates at least one of the applicable color components applies CCF, and the second CCF flag will have a value that indicates the first color component does not apply CCF. Thus, it can be inferred that CCF needs to be performed for the second color component and hence CCF is performed for the second color component (1128). Further, if the data packet includes all three of the first, second, and third CCF flags, then based on the encoder-side processes described above, the first CCF flag will have a value that indicates at least one of the applicable color components applies CCF, the second CCF flag will have a value that indicates the first color component applies CCF, and the third CCF flag will have a value that may indicate the second color component applies CCF or may indicate the second color component does not apply CCF. Hence, CCF is performed for the first color component and whether to perform CCF for the second color component depends on whether the third CCF flag has a value indicating the second color component applies CCF (1130).

In the above example methods 1100A and 1100B shown in FIGS. 11A and 11B, a scenario in which the block includes two applicable color components is shown and described as an example. Similar methods can be applied to scenarios with a different number of applicable color components, e.g., three or more applicable color components.

In some embodiments, to avoid parsing dependency, the statistics-based block level CCF on/off is not directly signaled to the decoder. Rather, the encoder can determine the statistics-based block level CCF on/off as a prediction, and signal whether the prediction is correct or not (true or false) to the decoder. The decoder can determine whether to perform CCF for the block according to the prediction and the statistics information of the block. The process is described in more detail below.

Figure 12:
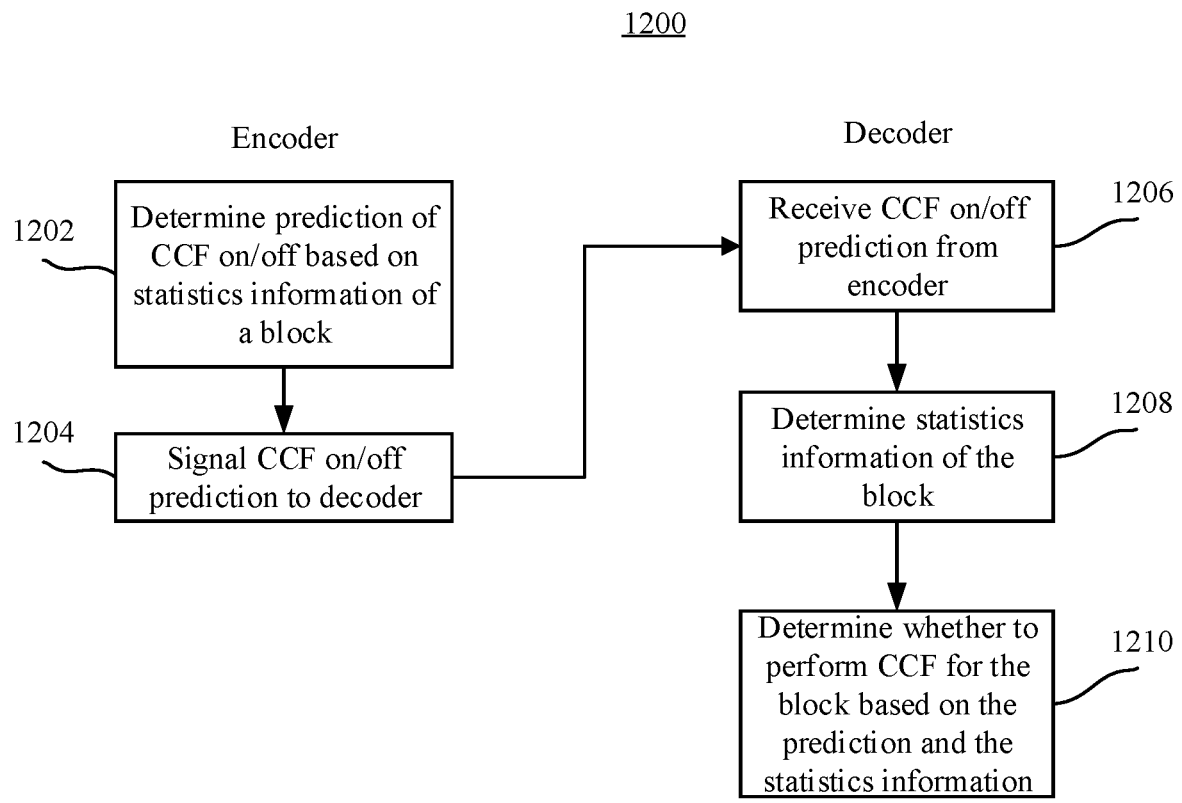
FIG. 12 is a flow chart showing another example image processing method consistent with the disclosure.

FIG. 12 is a flow chart showing an example image processing method 1200 consistent with the disclosure. Each of the encoder and the decoder in FIG. 12 can be implemented by an electronic device, e.g., the computer system 200 or a part of the computer system 200 as described above. As shown in FIG. 12, at 1202, the encoder determines a CCF on/off prediction for a block based on statistics information of the block. At 1204, the encoder signals the CCF on/off prediction to the decoder. At 1206, the decoder receives the CCF on/off prediction from the encoder. At 1208, the decoder determines the statistics information of the block. At 1210, the decoder determines whether to perform CCF for the block based on the CCF on/off prediction and the statistics information of the block.

In some embodiments, if the CCF on/off prediction is true, the decoder can determine that the determined statistics information of the block is reliable. In this scenario, the decode can determine whether to perform CCF for the block according to whether the statistics information of the block satisfies a condition, e.g., whether the statistics information of the block indicates the block is a smooth area. For example, the decoder can determine to perform CCF if the statistics information of the block satisfies the condition (the determined statistics information indicates the block is a smooth area) and determine not to perform CCF if the statistics information of the block does not satisfy the condition (the determined statistics information indicates the block is not a smooth area).

In some embodiments, if the CCF on/off prediction is false, the decoder can determine that the determined statistics information of the block is not reliable. In this scenario, the decode can determine whether to perform CCF for the block according to whether the statistics information of the block does not satisfy the condition, e.g., whether the statistics information of the block indicates the block is not a smooth area. For example, the decoder can determine to perform CCF if the statistics information of the block does not satisfy the condition (the determined statistics information indicates the block is not a smooth area) and determine not to perform CCF if the statistics information of the block satisfies the condition (the determined statistics information indicates the block is a smooth area).

Figure 13:
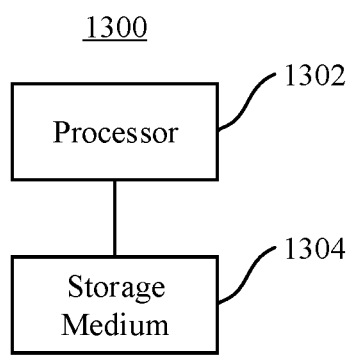
FIG. 13 is a block diagram of an example electronic device consistent with the disclosure.

FIG. 13 is a block diagram of an electronic device 1300 consistent with the disclosure. The electronic device 1300 can implement an encoder or a decoder consistent with the disclosure, or a portion of the encoder or the decoder, or can include the encoder or the decoder. As shown in FIG. 13, the electronic device 1300 includes a processor 1302 and a non-transitory computer-readable storage medium 1304. The processor 1302 can include, e.g., a computer processor, a processing unit, a microprocessor, a digital signal processor, a controller, a microcontroller, or the like. The storage medium 1304 can include, e.g., at least one of a static random-access memory (SRAM), a dynamic random-access memory (DRAM), an erasable programmable read-only memory (EPROM), an electrically erasable programmable read-only memory (EEPROM), or a flash memory, e.g., a universal serial bus (USB) memory. The storage medium 1304 can store instructions that, when executed by the processor 1302, can cause the processor 1302 to perform a method consistent with the disclosure, such as one of the above-described example methods.

According to the disclosure, less information needs to be coded and transmitted from the encoder to the decoder or less processing time is needed for obtaining statistics information. Therefore, coding efficiency can be improved and complexity can be reduced.

Further, less storage space and transmission bandwidth are needed. The overall efficiency of the image processing can be improved.

Although the principles and implementations of the present disclosure are described by using specific embodiments in the specification, the foregoing descriptions of the embodiments are only intended to help understand the method and core idea of the method of the present disclosure. Meanwhile, a person of ordinary skill in the art may make modifications to the specific implementations and application range according to the idea of the present disclosure. In conclusion, the content of the specification should not be construed as a limitation to the present disclosure.

What is claimed is:

1. An image processing method, applied to an encoder, and the method comprising:
obtaining, by the encoder, statistics information of a block of an image frame;
determining, by the encoder, whether the statistics information satisfies a condition;
in response to determining the statistics information satisfies the condition, determining, by the encoder, CCF (cross component filtering) signaling be disabled; and
excluding, by the encoder, the CCF signaling in a bitstream transmitted to a decoder, the bitstream corresponding to the block, comprising: excluding a CCF flag in the bitstream transmitted to the decoder.

2. The image processing method of claim 1, wherein excluding the CCF signaling comprises excluding the CCF flag in a block header of a data packet corresponding to the block.

3. The image processing method of claim 1, further comprising:
generating, by the encoder, CCF coefficients of a first portion of pixels of the block according to the statistics information of the block; and
excluding, by the encoder, a second portion of pixels of the block from being processed for CCF coefficients generation.

4. The image processing method of claim 1, wherein determining whether the statistics information satisfies the condition comprises determining whether a percentage of pixels of the block coded by a specific mode is greater than a threshold, the specific mode including a skip mode or an intra mode.

5. The image processing method of claim 1, further comprising:
receiving, by the decoder, the bitstream transmitted from the encoder;
determining, by the decoder, whether the bitstream excludes the CCF flag; and
in response to determining the bitstream excludes the CCF flag, performing, by the decoder, a default action on the block, the default action including not to perform CCF.

6. The image processing method of claim 1, wherein the block includes a first color component and a second color component different than the first color component, the method further comprises:
determining, by the decoder, to disable CCF for the first color component of the block; and
determining, by the decoder, to disable CCF for the second color component of the block.

7. An image processing apparatus, comprising: an encoder, the encoder including: a memory storing computer program instructions; and a processor coupled to the memory and configured to execute the computer program instructions and perform:
obtaining, by the encoder, statistics information of a block of an image frame;
determining, by the encoder, whether the statistics information satisfies a condition;
in response to determining the statistics information satisfies the condition, determining, by the encoder, CCF (cross component filtering) signaling be disabled; and
excluding, by the encoder, the CCF signaling in a bitstream transmitted to a decoder, the bitstream corresponding to the block, comprising: excluding a CCF flag in the bitstream transmitted to the decoder.

8. The image processing apparatus of claim 7, wherein excluding the CCF signaling includes excluding the CCF flag in a block header of a data packet corresponding to the block.

9. The image processing apparatus of claim 7, wherein the processor is further configured to execute the computer program instructions and perform:
generating, by the encoder, CCF coefficients of a first portion of pixels of the block according to the statistics information of the block; and
excluding, by the encoder, a second portion of pixels of the block from being processed for CCF coefficients generation.

10. The image processing apparatus of claim 7, wherein determining whether the statistics information satisfies the condition includes determining whether a percentage of pixels of the block coded by a specific mode is greater than a threshold, the specific mode including a skip mode or an intra mode.

11. The image processing apparatus of claim 7, wherein the processor is further configured to execute the computer program instructions and perform:

receiving, by the decoder, the bitstream transmitted from the encoder;

determining, by the decoder, whether the bitstream excludes the CCF flag; and in response to determining the bitstream excludes the CCF flag, performing, by the decoder, a default action on the block, the default action including not to perform CCF.

12. The image processing apparatus of claim 7, wherein the block includes a first color component and a second color component different than the first color component, and wherein the processor is further configured to execute the computer program instructions and perform:

determining, by the decoder, to disable CCF for the first color component of the block; and determining, by the decoder, to disable CCF for the second color component of the block.

13. A non-transitory computer-readable storage medium storing computer program instructions executable by at least one processor of an encoder to perform:

obtaining, by the encoder, statistics information of a block of an image frame;

determining, by the encoder, whether the statistics information satisfies a condition;

in response to determining the statistics information satisfies the condition, determining, by the encoder, CCF (cross component filtering) signaling be disabled; and excluding, by the encoder, the CCF signaling in a bitstream transmitted to a decoder, the bitstream corresponding to the block, comprising:

excluding a CCF flag in the bitstream transmitted to the decoder.

14. The non-transitory computer-readable storage medium of claim 13, wherein excluding the CCF signaling includes excluding the CCF flag in a block header of a data packet corresponding to the block.

15. The non-transitory computer-readable storage medium of claim 13, wherein the computer program instructions are further executable by the at least one processor of the encoder to perform:

generating, by the encoder, CCF coefficients of a first portion of pixels of the block according to the statistics information of the block; and excluding, by the encoder, a second portion of pixels of the block from being processed for CCF coefficients generation.

16. The non-transitory computer-readable storage medium of claim 13, wherein the computer program instructions are further executable by the at least one processor of the encoder to perform:

receiving, by the decoder, the bitstream transmitted from the encoder;

determining, by the decoder, whether the bitstream excludes the CCF flag; and in response to determining the bitstream excludes the CCF flag, performing, by the decoder, a default action on the block, the default action including not to perform CCF.

17. The non-transitory computer-readable storage medium of claim 13, wherein the block includes a first color component and a second color component different than the first color component, and wherein the computer program instructions are further executable by the at least one processor of the encoder to perform:

determining, by the decoder, to disable CCF for the first color component of the block; and determining, by the decoder, to disable CCF for the second color component of the block.

* * * * *